(12) United States Patent
Coutant et al.

(10) Patent No.: US 6,576,834 B2
(45) Date of Patent: Jun. 10, 2003

(54) SYSTEM FOR BUILDING AN ELECTRICAL DEVICE INTO A CONDUIT SHALLOWER THAN THE DEVICE

(75) Inventors: Régis Coutant, Vauciennes (FR); Frédéric Xerri, Limoges (FR)

(73) Assignee: Planet Wattohm, Senlis (FR)

( * ) Notice: Subject to any disclaimer, the term of this patent is extended or adjusted under 35 U.S.C. 154(b) by 0 days.

(21) Appl. No.: 09/951,636

(22) Filed: Sep. 14, 2001

(65) Prior Publication Data

US 2002/0033268 A1 Mar. 21, 2002

(30) Foreign Application Priority Data

Sep. 15, 2000 (FR) .............................................. 00 11798

(51) Int. Cl.[7] .............................. H02G 3/04; H02G 3/12
(52) U.S. Cl. ........................ 174/48; 174/68.1; 52/220.1
(58) Field of Search .............................. 174/48, 49, 50, 174/58, 53, 54, 68.1, 95, 99 R; 220/3.2, 3.8, 3.3, 4.02, 4.01; 52/220.1, 220.3, 220.5, 220.7

(56) References Cited

U.S. PATENT DOCUMENTS

| | | | | |
|---|---|---|---|---|
| 3,592,956 A | * | 7/1971 | Fork ........................... | 174/101 |
| 3,932,696 A | * | 1/1976 | Fork et al. ..................... | 174/48 |
| 4,178,469 A | * | 12/1979 | Fork ........................... | 174/57 |
| 4,443,654 A | * | 4/1984 | Flachbarth et al. ............ | 174/48 |
| 4,580,379 A | * | 4/1986 | Nusbaum ..................... | 52/220.4 |
| 5,010,211 A | * | 4/1991 | Bartee .......................... | 174/67 |
| 5,614,695 A | * | 3/1997 | Benito Navazo ............ | 220/3.3 |
| 5,942,724 A | * | 8/1999 | Russo et al. ................... | 174/48 |
| 6,072,121 A | * | 6/2000 | Penczak et al. ................ | 174/49 |
| 6,211,460 B1 | * | 4/2001 | Hull et al. ..................... | 174/66 |
| 6,335,485 B1 | * | 1/2002 | Benito-Navazo ............. | 174/50 |
| 6,350,135 B1 | * | 2/2002 | Acklin et al. .................. | 174/48 |

FOREIGN PATENT DOCUMENTS

| | | |
|---|---|---|
| EP | 0 440 556 A1 | 8/1991 |
| FR | 2 724 498 | 3/1996 |
| FR | 2 729 255 | 7/1996 |

* cited by examiner

*Primary Examiner*—Dean A. Reichard
*Assistant Examiner*—Angel R. Estrada
(74) *Attorney, Agent, or Firm*—Young & Thompson

(57) ABSTRACT

A system for building at least one electrical device into a wiring conduit whose depth is less than the depth of the device includes at least one support which can be fixed in the conduit and receives the electrical device(s) so that a front face of the device or each device is flush with a front face of the conduit via an opening formed in corresponding relationship therein. The system further includes at least one pattress which is passed through an opening formed in corresponding relationship to it in the bottom of the conduit to form therein a recess for accommodating a rear part of the device. The pattress is separate from the support and has its own means for fixing it to the conduit.

22 Claims, 5 Drawing Sheets

SYSTEM FOR BUILDING AN ELECTRICAL DEVICE INTO A CONDUIT SHALLOWER THAN THE DEVICE

BACKGROUND OF THE INVENTION

1. Field of the Invention

The present invention relates generally to fixing a device of any kind, such as a socket outlet or a telecommunication jack, into conduit of any kind, such as a baseboard, coving, column or other form of conduit, used for electrical power and/or telecommunication installations in domestic or business premises.

2. Description of the Prior Art

In some installations, in the case of both new construction and renovation, conduit fixed to the wall is often used for electrical or optical wiring. The conduit therefore runs horizontally along the walls, at the bottom in the manner of a baseboard, at the top in the manner of coving, or vertically against a wall, in a corner or on a column. The conduit provides a functional and protected internal wiring path enabling easy and reliable connection to diverse electrical or telecommunication devices.

The electrical devices are generally housed individually or in groups in a support frame or housing which is usually fixed directly to the wall, being recessed into the wall to a greater or lesser degree, and adjoins the conduit, or even overlaps it locally, in the transverse direction relative to its longitudinal direction.

This has the advantage of fast installation and facilitates subsequent work. However, it has the disadvantage of a relatively large footprint on the wall (or the column), which is somewhat unesthetic and difficult to reconcile with localized problems of congestion. Moreover, "made to measure" recessing of the housing and the device(s) that it contains into the receiving wall is not always desirable or convenient.

In other installations, the conduit, which in this case is usually referred to as trunking, is deep enough to receive not only the electrical conductors but also the entire depth of the device(s) to be fixed. In this type of installation, the devices are either attached directly to the trunking or accommodated in a housing or on a support frame which is in turn attached to the trunking. An apertured plate (shield) is generally locally substituted for the cover section of the trunking to provide access via an opening of appropriate dimensions to the active front face of the device(s), which is then flush with the shield attached in this way. The housing containing the device(s) is thus entirely accommodated within the trunking, without projecting from it at the front or at the rear, the trunking being deep enough to contain the entire depth of the housing and the device(s) that it contains.

This type of installation, which has the advantage of reducing the width of the footprint on the wall, has the major disadvantage of requiring the trunking to be relatively deep throughout its length, which is highly unesthetic and usually represents a heavy penalty on the general ergonomics of the interior space delimited by the wall in question. Clearly, because of its depth, the trunking projects a relatively large distance from the wall, impeding the installation of furniture, and even the circulation of persons, trolleys or other vehicles.

In further installations, as shown in the document FR 2,729,255, for example, each electrical device is individually received in a housing that is accommodated in the conduit and has an overall depth greater than that of the conduit; it passes through the bottom of the conduit by means of an opening formed locally for this purpose therein. The surplus part of its depth, which projects from the bottom of the conduit, is received in a corresponding recess formed in the wall specifically for this purpose. The above document therefore proposes a system for building an electrical device into a wiring conduit whose depth is less than that of the device, including a support provided with means for fixing it in the conduit and means for receiving the electrical device so that the front face of the device is flush with the front face of the conduit through a corresponding opening formed therein, and a patttess, i.e., an open-ended box, typically for accommodating an electrical device, adapted to pass through a corresponding opening formed in the bottom of the conduit and to form therein a recess to receive the rear part of the device. The pattress, which projects externally from the rear face of the base section of the conduit, is received in the associated recess in the wall, in which it delimits a specific volume, and protects the device.

However, in this system, the device support and the pattress are made in one piece forming the previously mentioned housing for individually receiving each device. This leads to the following two major disadvantages. On the one hand, the resulting housing is relatively bulky and therefore difficult to store and transport. On the other hand, and more importantly, each housing is associated with a single device and it is therefore necessary to fix to the conduit as many housings as there are devices, which complicates installation, to the detriment of cost. On the other hand, the support part of the housing must be matched to the type of device to be installed, and it is therefore necessary to provide several types of housing matching the various types of device, which increases manufacturing and distribution costs and complicates installation.

The object of the invention is to overcome the above drawbacks as much as possible.

SUMMARY OF THE INVENTION

To this end, the invention provides a system for building at least one electrical device into a wiring conduit whose depth is less than the depth of the device, the system including:

at least one support provided with means for fixing it in the conduit and means for receiving the electrical device(s) so that a front face of each device is flush with a front face of the conduit via an opening formed in corresponding relationship therein, and at least one pattress adapted to pass through an opening formed in corresponding relationship to it in the bottom of the conduit and to form therein a recess for accommodating a rear part of the device, in which system the pattress is separate from the support and has its own means for fixing it to the conduit.

It is therefore possible to provide a standard pattress that can be associated with different types of support corresponding to the different types of device that can be installed in the conduit. This reduces fabrication and distribution costs, because only the support, to be more precise its means for receiving the device(s), requires diversification. Clearly fabrication, transport and storage of the support alone are simpler and consequently less costly than in the case of a more complex assembly including the device support and the pattress, as was the case in the prior art previously mentioned.

Also, during installation, it is particularly convenient to be able to use a standard pattress so that it is possible to use only one type of drilling and recessing tool, also of standard design, to form the opening in the bottom of the conduit and the recess in the wall.

Similarly, in the chronological sequence of installation operations, it is easier for the operator, after forming the opening in the bottom of the conduit and the recess in the wall, to install the pattress or pattresses which then delimit a specifically delimited and protected volume in the wall and in the recess in the back of the conduit. The device(s) with their support(s) can be fitted and fixed to the conduit subsequently by means of the recess delimited in this way and protected by the pattress. Clearly it is more convenient for the operator, when installing the devices, to have a clear view of the recessed volume in which the devices are to be received, delimited by the pattress. Also, and most importantly, the ability to dissociate fitting the pattress into the recess in the wall through the opening in the bottom of the base section of the conduit from fixing the support with its device to the base section, in correspondence with the pre-installed pattress, proves to be not only more convenient but also propitious to obtaining an installation of good quality.

It is therefore clear that dissociating these operations provides a clear delimitation of the various steps of the assembly process, which is propitious to rationalizing the tasks to be carried out. In fact, because of the dissociation of the pattress and the device support, it is possible to start by installing a plurality of pattresses belonging to a plurality of built-in fixing systems distributed between different device installation areas of one or more conduits of the same room or the same site and then to install the supports pre-equipped with their devices subsequently.

In accordance with one advantageous feature of the invention, the system includes a single support whose longitudinal dimensions and receiving means are adapted to receive a plurality of devices and a plurality of pattresses each associated with one of the devices. However, the support can be designed to receive only one device, of course.

Using a single support for several electrical devices in this way has the advantage, which in practice is invaluable, of enabling the support to be pre-equipped with different devices to be installed and the pre-equipped support, with all of the devices, then to be fitted onto the base section of the conduit in a single operation. It is in particular possible to prefit the support with the various devices in the manufacturing plant, and even to prewire them. Compared to the prior art, which has entailed using an individual housing for each device, the operator saves a considerable amount of time since, instead of fixing and wiring the housings one by one on the base section of the conduit, he can fix the common support and thereby install all of the devices simultaneously in a single operation and make the electrical connections to the resulting assembly.

In accordance with another advantageous feature of the invention, the system includes at least two pattresses each having a line of weakness adapted to enable the detachment of a lateral portion of the pattress along a lateral cut edge delimiting a lateral opening by which two adjacent pattresses can be combined so that they are contiguous at their respective lateral cut edges. In this way, from two standard pattresses, a double pattress is obtained able to accommodate two juxtaposed devices or a single large device.

Advantageously, in this case, each pattress has a lateral envelope of globally cylindrical shape and the line of weakness is in a plane that is parallel to the axis of the cylindrical envelope but does not contain the axis optionally, to associate three or more pattresses, each pattress has two lines of weakness symmetrical to each other with respect to the axis of the cylindrical envelope.

In one advantageous embodiment, the means for fixing the support to the conduit include at least two lateral skids adapted to be engaged with two associated slides formed longitudinally on the bottom of the conduit. This method of attaching the device support to the conduit is not only simple but also convenient for the installer or a subsequent worker. In fact it is sufficient to engage the skids of the support with the associated slides of the base section of the trunking, for example with a simple clipping action, and then to adjust the longitudinal position of the device support on the conduit by causing the skids to slide in the slide.

To facilitate further use of the system and to reinforce the immobilization of the support on the bottom of the conduit, at least one of the lateral fixing skids of the support can be mobile laterally between a configuration in which it is immobilized by friction on the corresponding slide of the conduit, a configuration in which it can slide freely on the slide, and a configuration in which it is completely released from the slide.

Advantageously, in this case, the mobile skid is acted on by a locking member mobile between a locking position holding the mobile skid in its configuration immobilized on the slide and an unlocking position leaving the mobile skid tree to revert to its configuration of freely sliding on the slide or of complete release from the slide.

For example, the locking member of the mobile skid includes a cam member pivotally mounted on the support and adapted to receive an actuator of any kind for pivoting it between two angular positions constituting the locking and unlocking positions. In particular, the two angular positions of the cam member can be separated by one quarter-turn. This is the case, for example, if the cam member comprises a journal received to pivot freely in a well or bearing formed on the support, a head disposed at one of the two ends of the journal and on which is formed an imprint adapted to cooperate with a screwdriver or like tool, and a shoe disposed at the other end of the journal and having the overall shape of a parallelepiped elongate transversely to the pivot axis of the journal.

To make locking more reliable, the shoe of the cam member can have a boss adapted to be received in an imprint formed in a corresponding part of the support to immobilize the cam member temporarily in a locking position.

To simplify manufacture and reduce costs, the cam member, its journal, its head and its shoe can be molded in one piece from a plastics material.

Similarly, the support and its lateral fixing skids are molded in one piece from a plastics material. In this case, the mobility of the mobile shoe is the result of the resilience of the shoe, with a relaxed configuration corresponding to the configuration in which it is interengaged with and slides freely on the corresponding slide of the conduit.

Again in an advantageous embodiment of the invention, the means for fixing the pattress to the conduit include rigid bearing lugs projecting radially outward at the open front edge of the pattress and adapted to bear on the bottom of the conduit. The means for fixing the pattress to the conduit can further include at least two locking fingers formed at the open top edge of the pattress and adapted to interengage with the corresponding slide of the bottom of the conduit after radial outward deformation of the pattress.

Other features and advantages of the invention will become apparent in the light of the following description of one particular embodiment, which description as given by way of non-limiting example and with reference to the accompanying drawings.

DETAILED DESCRIPTION OF THE PREFERRED EMBODIMENTS

Figure 1:
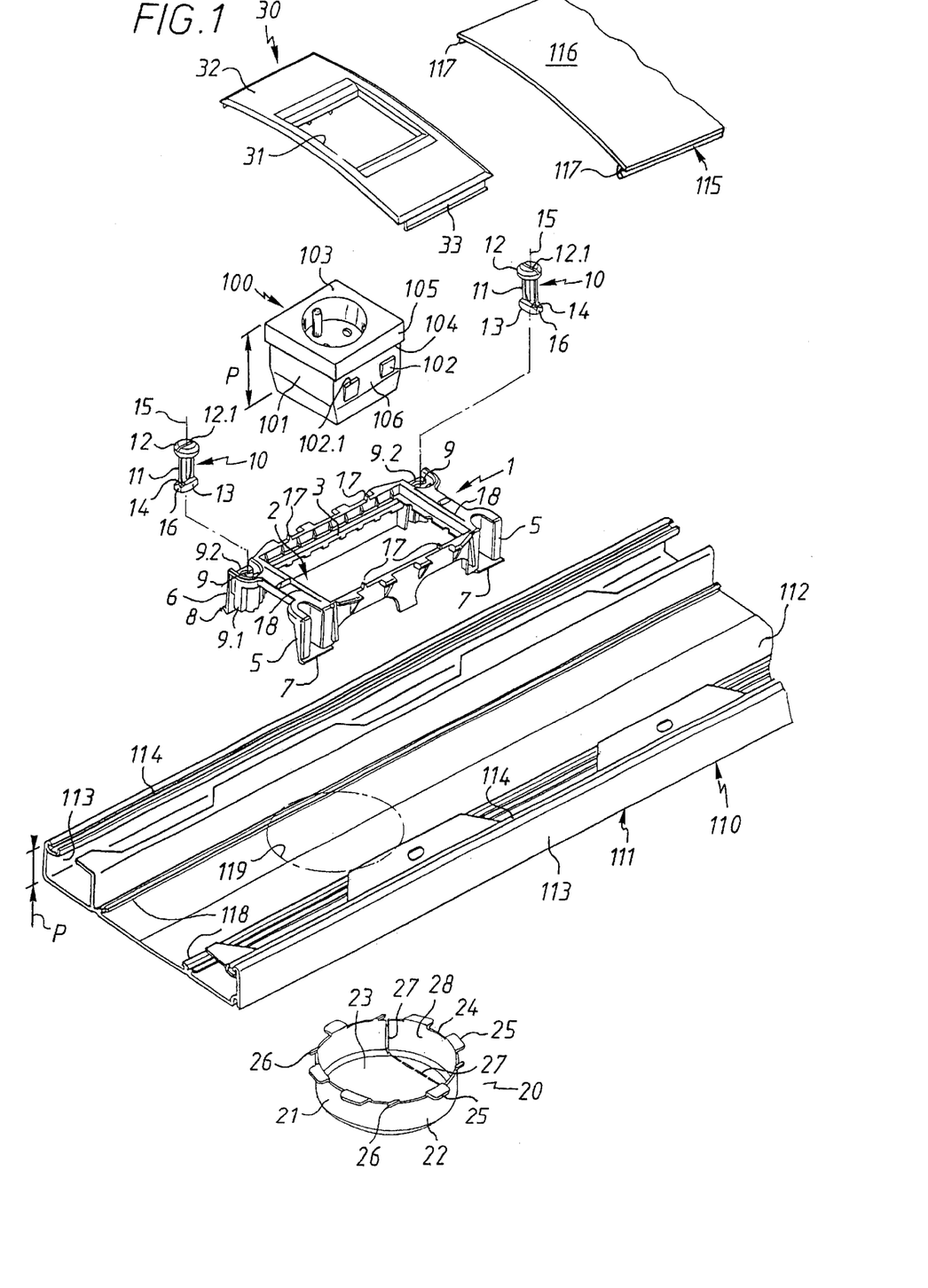
FIG. 1 is an exploded perspective view of a system in accordance with the invention for building an electrical device into a wiring conduit.
Figure 2:
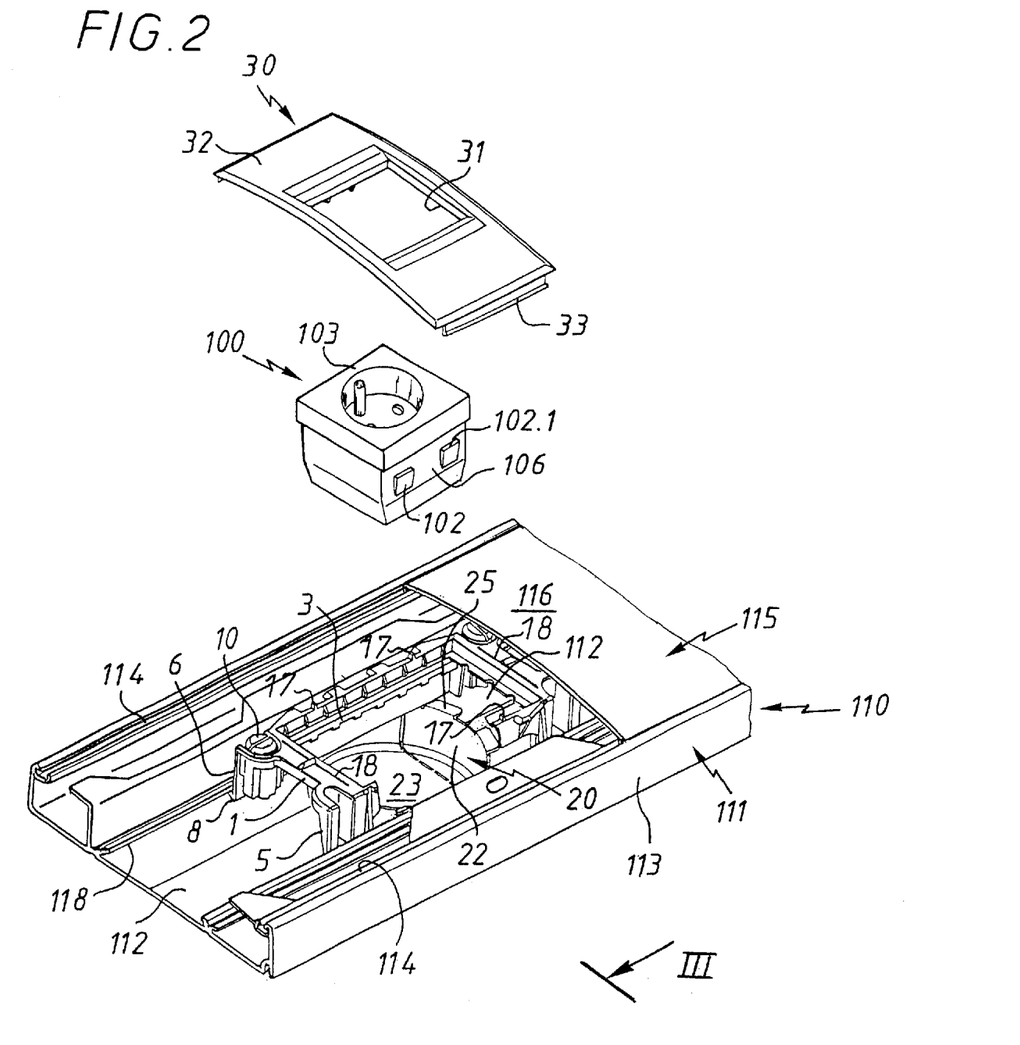
FIG. 2 is a perspective view similar to FIG. 1 showing the fixing system in accordance with the invention installed in the base section of the conduit.
Figure 3:
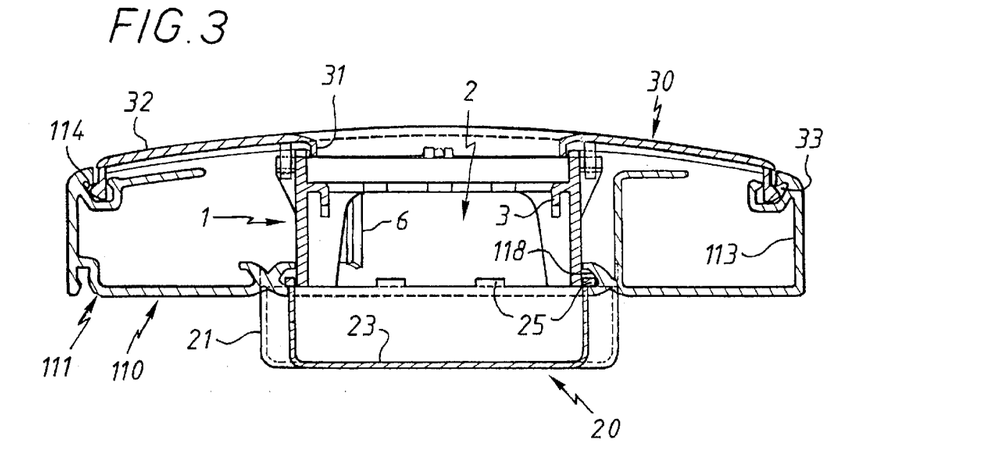
FIG. 3 is a view in cross section taken along the line III in FIG. 2.
Figure 4:
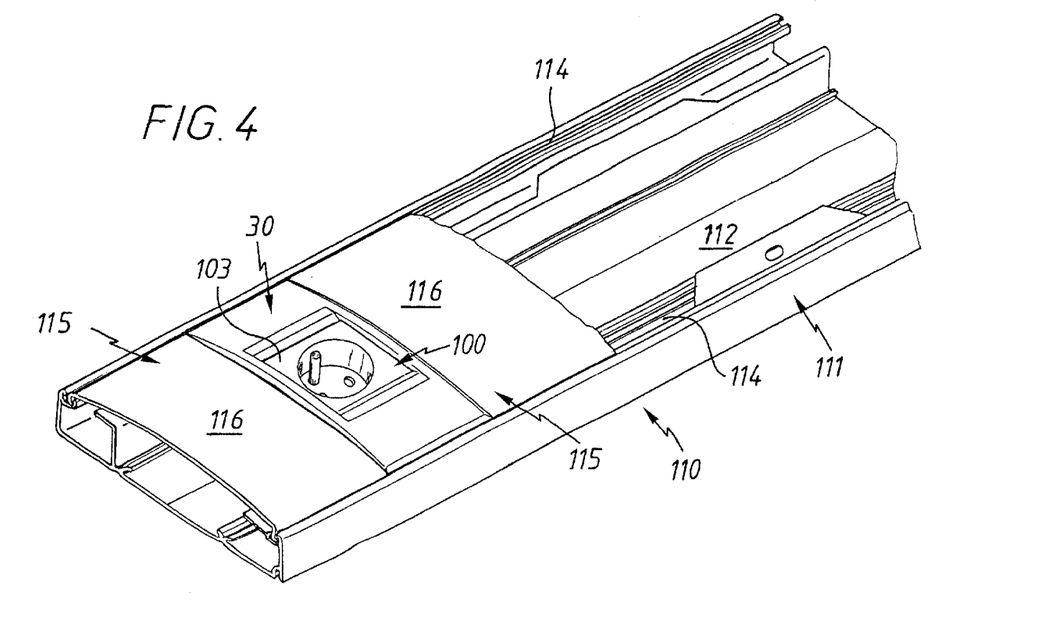
FIG. 4 is a perspective view similar to FIG. 2 showing from the outside the conduit equipped with an electrical device built into it by means of the system in accordance with the invention.

Referring to the figures, and to FIG. 1 in particular, the overall aim is to build an electrical device 100 into a wiring conduit 110 completely so that the device and the conduit are flush at the front.

The electrical device 100 shown in the figures is a standard socket outlet whose construction is known in itself, does not specifically form any part of the present invention and is therefore not described in detail. Suffice to say that the device 100 includes, in the usual way, a parallelepiped-shaped body 101 provided on two opposite lateral faces with teeth 102 and having an active front face 103 on which means for interfacing with the exterior environment (in this instance holes for inserting the pins of a corresponding plug) are accessible. A flange 105 adjacent the active front face 103 forms a shoulder 104 toward the rear that, in conjunction with the teeth 102, delimits a groove 106 on each of the corresponding lateral faces of the body 101; this groove is used for fixing the device 100, as explained in more detail later. The device has an overall depth P.

The wiring conduit 110, whose construction is not described in detail either, includes a base section 111 which is made from an extruded plastics material, a drawn metal such as aluminum, or rolled steel, for example. The base section 111 has a flat bottom 112 and two longitudinal flanges 113 formed by right-angled lateral rims of the bottom 112. The two flanges 113 have a height p that substantially corresponds to the overall depth of the conduit. The basic problem, which the invention aims to solve, is that the overall depth p of the conduit 110 is slightly less than the depth P of the device 100.

A cover section 115 is attached to the base section 111 of the conduit 110 and to this end its two lateral edges are provided with two longitudinal beads 117 adapted to engage in two corresponding longitudinal grooves 114 formed at the top of the flanges 113 of the base section 111.

Finally, on each side of its median plane, the bottom 112 of the base section 111 has on its inside or front face two blades 118 that are inclined toward each other and form fixing rails or slides adapted to cooperate with the system in accordance with the invention. In this example the slides 118 are formed in one piece with the remainder of the base section 111, for example by extrusion. However, they could equally well be attached to it, for example by welding, riveting, etc.

Figure 5:
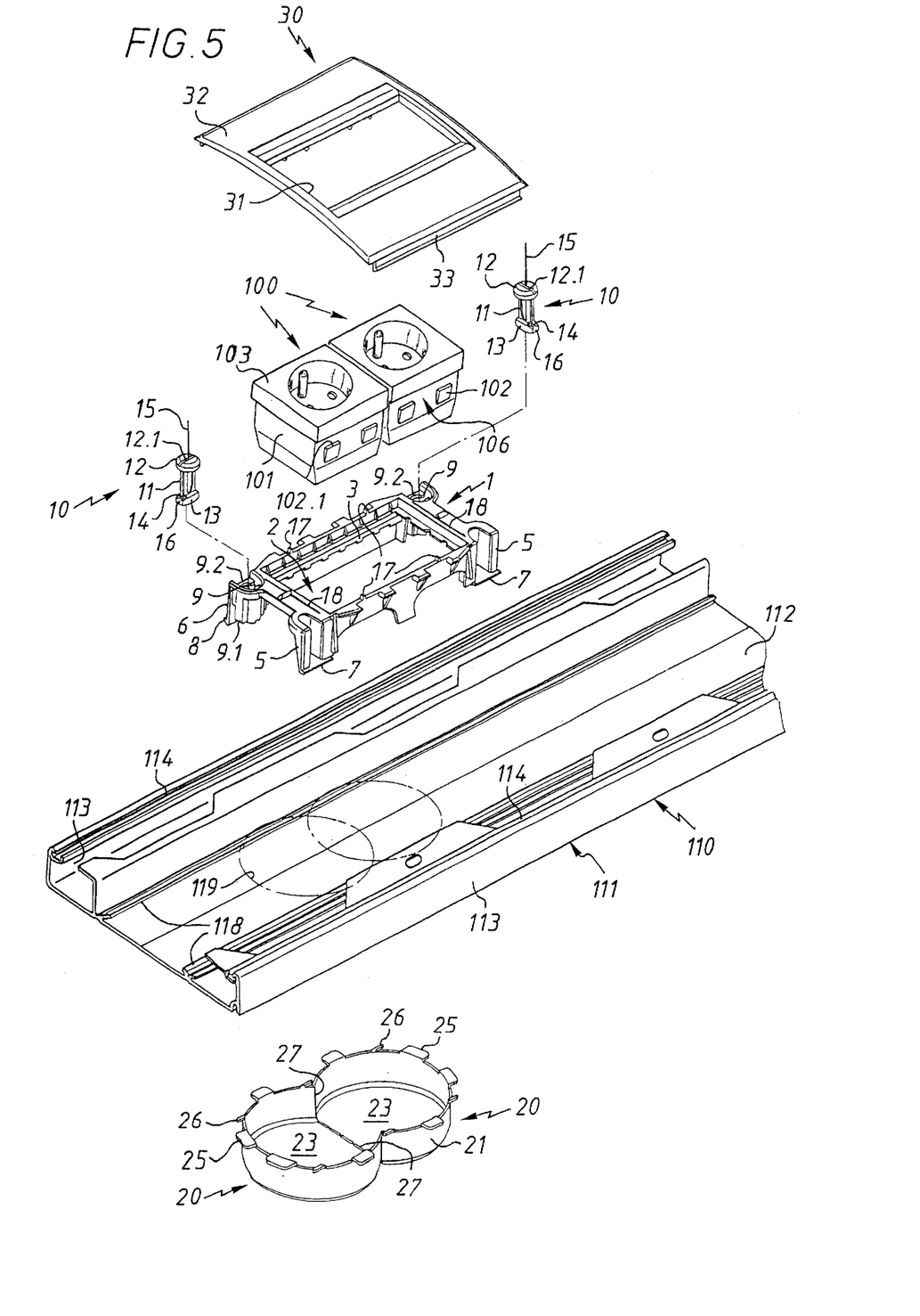
FIG. 5 is an exploded perspective view similar to FIG. 1 showing another example of use of the device for building two juxtaposed electrical devices into a wiring conduit, the device then including a single support and two twinned pattresses.
Figure 6:
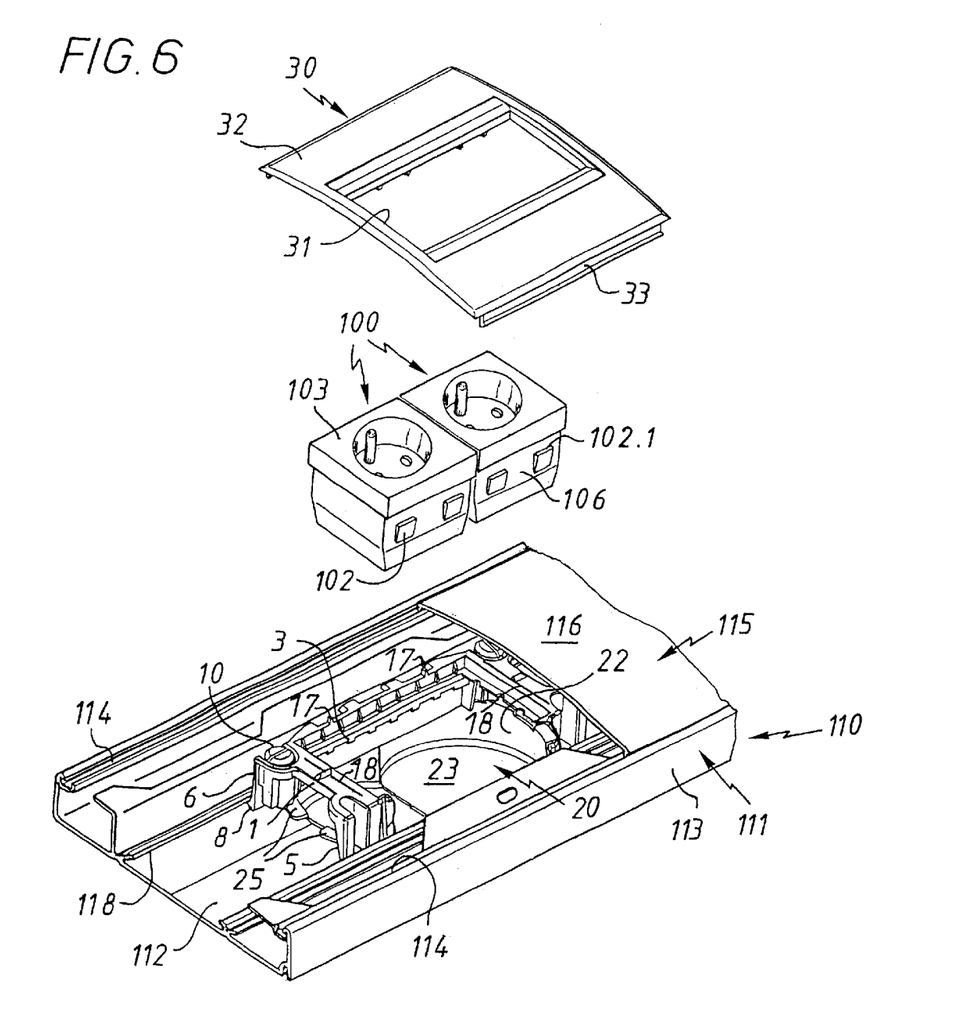
FIG. 6 is a perspective view similar to FIG. 5 showing the fixing system installed on the base section of the conduit.

The device 100 is mounted on the conduit 110 by means of a support frame 1. The frame 1 is globally rectangular and has a longitudinal direction (the direction of its greatest dimension) which, after installing it on the conduit 110, coincides with the longitudinal direction of the conduit 110. It has a rectangular central space 2 adapted to receive one or more electrical devices such as the device 100. In the example shown, the dimensions of the central space 2 of the support frame 1 are chosen to receive either a single electrical device 100, as shown in FIGS. 1 to 4, or two electrical devices 100, as shown in FIGS. 5 and 6.

To enable the device(s) 100 to be fixed to the frame 1, the central space 2 of the frame is bordered longitudinally by two crenellated rims or ledges 3 on their rear flank which constitute the means for receiving the device(s) 100 on the support frame 1. The two longitudinal crenellated rims 3 formed in this way on the inside of the frame 1 form a passage with a sticking point for the teeth 102 on the body 101 of the device 100 to be installed. Accordingly, when the device 100 is inserted into the central space 2 of the support frame 1, its teeth 102, which have inclined entry faces forming ramps, force slight elastic spreading of the frame 1 on coming into contact with the rims 3, enabling the teeth 102 to escape from the rims 3. However, note that it would also be possible for the teeth 102 to be elastically retractable themselves, in which case no elastic spreading of the frame 1 would be necessary.

Be this as it may, after the teeth 102 have crossed over them, the longitudinal rims 3 are received in the grooves 106 of the device 100 and immobilize it because they are interengaged with the stop face 102.1 of the teeth 102 that oppose extraction of the device 100 and the shoulder 104 which opposes pressing in of the apparatus 100 and because the teeth 102 are received in the crenellations provided to the rear of the rims 3 and are therefore immobilized on the frame 1 in its longitudinal direction.

The support frame 1 further includes means for fixing it to the base section 111 of the conduit 110. The fixing means take the form of four lateral skids 5, 6 formed at the four corners of the support frame 1 and each provided with a heel or blade 7, 8 adapted to be interengaged with the slides 118 provided on the back 112 of the base section 111 of the conduit 110.

To be more precise, the two skids 5 on the same longitudinal side of the frame 1, and therefore adapted to be interengaged with the same slide 118, are relatively rigid, whereas the other two skids 6 on the other side of the frame 1 and adapted to interengage with the other slide 118 have some transverse mobility, i.e. some mobility in a direction perpendicular to the longitudinal direction of the frame 1 and the conduit 110. Thus each of the two skids 6 is mobile between a configuration in which it is immobilized on the corresponding slide 118 of the base section 111 of the conduit 110 by friction or by clamping, a configuration in which it can slide freely on the slide, and a configuration in which it is released completely from the slide, enabling extraction of the support frame 1.

In this example the support frame 1 with its receiving rims 3 and its fixing skids 6, 7 is made in one piece, for example from a molded plastics material or a cast metal such as Zamak. In particular, the skids 5, 6 are in one piece with the remainder of the frame 1. This being the case, the mobility of the mobile skids 6 results from the inherent resilience of the skids, with a relaxed configuration corresponding to the configuration of interengagement with and free sliding on the corresponding slide 118.

Each of the two mobile skids 6 is placed and held in its immobilized by friction or released configuration by external action forcibly flexing the mobile skid 6 concerned against its inherent elasticity.

For example, each mobile skid 6 can be flexed toward its released configuration (if it is occasionally wished to demount the housing) by using a screwdriver or similar tool to apply an inward retraction force on the skid to disengage it from the slide 118.

Specific means are provided at each of two corresponding corners of the support frame 1 for placing and holding each mobile skid 6 in its immobilized by friction configuration. To be more precise, each of the two mobile skids 6 is acted on by a locking member 10 which is mobile between two positions, one of which is a locking position holding the mobile skid 6 concerned in its immobilized configuration on the slide 118 and the other of which is an unlocking position leaving the mobile skid 6 free to return to its configuration of free sliding on the slide 118 or of complete release from the slide.

In the example shown, each of the two locking members 10 takes the form of a cam member mounted on the corner concerned of the frame 1 to pivot about an axis 15 adjacent the associated mobile skid 6 between two angular positions constituting its positions respectively locking and unlocking the mobile skid 6. The cam member 10 comprises a journal 11 received and pivoting freely in a well or bearing 9 formed at the corresponding corner of the support frame 1, a head 12 at one of the two ends of the journal 11 and on which is formed an imprint 12.1 adapted to accommodate the head of a screwdriver or similar tool, and a shoe 13 at the other end of the journal 11.

The shoe 13 has a globally parallelepipedal shape, and is elongate transversely to the pivot axis 15 of the journal 11 in the well 9 and rounded at its corners. On pivoting toward its locking position, in which it is perpendicular to the blade 8 of the associated mobile skid 6, i.e. perpendicular to the longitudinal direction of the rectangular frame 1 and of the conduit 110, the rounded tip 16 of the shoe 13 comes into contact with the inside face of the mobile skid 6 concerned and slides against it to push it outward, in the manner of a cam, to press it tightly against the corresponding slide 118 of the base section 111 of the conduit 110. Conversely, on pivoting from this locking position toward its unlocking position substantially parallel to the blade 8 of the associated shoe 13, i.e. substantially parallel to the longitudinal direction of the frame 1 and the conduit 110, the rounded tip 16 of the shoe 13 slides against the inside face of the mobile skid 6 concerned and moves progressively away from it until it is released from it. Note further that, as soon as the shoe 13 moves away from its locking position perpendicular to the blade 8 of the mobile skid 6 concerned, the mobile skid 6 tends to revert spontaneously to its relaxed configuration, i.e. to its configuration of sliding freely on the corresponding slide 118, and consequently, because of its inherent elasticity, to push the cam member 10 back into the unlocking position. Accordingly, by means of the cam member 10, the mobile skids 6 are convenient and quick to lock in their immobilized by friction configuration. The locking action is of the quarter-turn type, the locking and unlocking angular positions of the cam member 10 being separated by one quarter-turn.

A boss 14 protruding from the top face of the shoe 13 of the cam member 10 is adapted to be received in an imprint (not seen in the figures) formed on a corresponding part of the support frame 1 to immobilize the can member 10 temporarily in the locking position. To be more precise the imprint receiving the boss 14 is formed in a bottom end shoulder 9.1 of the reception well 9 and the head 12 of the cam member 10 abuts against a top end shoulder 9.2 of the well 9, so that the top of the shoe 13 of the cam member 10 is pressed tightly against the end shoulder 9.1 of the well 9 by virtue of slight elastic deformation of the cam member 10 as a whole.

On the same principle, an equivalent alternative solution would be to provide the boss on the shoe 13 of the cam member 10 at the top 16 of the shoe (this solution is not adopted in the example shown). The imprint receiving the boss formed at the tip of the shoe 13 would then be formed in the corresponding mobile skid 6 at the location of the pivot axis 15 of the cam member 10.

In this example, the journal 11 of the cam member 10 has a profile of star-shaped cross section.

The cam member 10 with its journal 11, its head 12 and its shoe 13 can advantageously be molded in one piece from a plastics material.

Similarly, the bearing or well 9 with its two shoulders 9.1, 9.2 is preferably also formed in one piece with the remainder of the support frame 1.

The receiving rim 3 and the fixing skids 5, 6 are adapted so that the front face 103 of the device 100 is flush with the front face 116 of the cover 115 of the conduit 110.

To be more precise, to enable installation of the device 100 and to provide access to its front face 103, the cover 115 is cut on either side of the area in which the device 100 is installed in the conduit 110. The opening left in this way by the localized interruption of the cover section 115 of the conduit 110 is closed off by means of an apertured cover or shield 30 that is therefore substituted locally for the missing portion of the cover section 115, as can be seen more clearly in FIG. 4. The shield 30 has an opening 31 whose shape and dimensions match and provide direct access to the outside contour of the front face 103 of the device 100. The active front face 103 of the device 100 is therefore flush with or set back slightly from the front face 32 of the shield 30.

Like the cover section 115 of the conduit 110, for fixing it to the base section 111 of the conduit 110, the shield 30 is provided with longitudinal beads 33 along its lateral edges that engage in the lateral grooves 114 on the base section 111 of the conduit 110. However, the shield 30 could be provided with other means for fixing it to the support frame 1, in addition to or instead of the beads 114 for fixing it to the base section 111 of the conduit 110.

The shield 30 can be contiguous with the cover section 115 or cover its edges. In this way, the shield 30 restores the continuity of the cover section 115 of the conduit 110 whilst providing access to the active front face 103 of the device 100 that is flush with the front faces 32 and 116 of the shield 30 and the cover section 115.

To facilitate accurate positioning of the cover section 115 relative to the frame 1 on the base section 111, the latter is provided on the one hand with abutments 17 projecting in front of the longitudinal branches of the frame 1 to delimit a truncation of the cover section 115 adapted to provide free access to a single small device 100 (single-station installation), as shown in FIGS. 1 to 4, and on the other hand with marks 18 on the transverse branches of the frame 1 to delimit visually a truncation of the cover section that is wider and adapted to provide free access to a double and/or larger device (multistation installation), as shown in FIGS. 5 and 6.

To enable the electrical device 100 to be built completely into the conduit 110, given that its depth P is greater than the depth p of the conduit, the device according to the invention further includes a pattress 20 adapted to pass through a corresponding opening 119 formed in the back 112 of the base section 111 of the conduit 110 and to form in that back 112 a recess receiving the rear part of the device 100 that projects in the direction of the depth of the conduit 110.

In accordance with one essential feature of the invention, the pattress 20 takes the form of a component that is entirely distinct and separate from the support frame 1 and has its own means for fixing it to the base section 111 of the conduit 110.

To be more precise, the pattress 20 has a cylindrical lateral envelope 21 whose rear edge 22 is closed by a solid and preferably flat bottom 23 and whose front edge 24 is open. In corresponding relationship with the cylindrical contour of the envelope 21, the opening 119 formed in the bottom 112 of the base section 111 of the conduit 110 has a circular contour with substantially the same diameter.

Means for fixing the pattress 20 to the base section 111 of the conduit 110 are provided on the open edge 24 of the pattress 20. The fixing means include a bearing part and a locking part.

The bearing part of the fixing means consists of rigid bearing lugs 25 projecting radially outward at the open front edge 24 of the envelope 21 so as to bear against the inside face (front face) of the bottom 112 of the base section 111 of the conduit 110. Alternatively, some of the lugs 25 can be elongate and provided with holes for screws or rivets to reinforce the fixing by the fingers 26.

The locking part of the fixing means includes four locking fingers 26 formed at the open front edge 24 of the envelope 21 and protecting outward in a common direction which, in situ, is coincident with the longitudinal direction of the conduit 110. The locking fingers 26 are adapted to pass over the slides 118 of the base section 111 of the conduit 110 by virtue of radial elastic contraction of the cylindrical envelope 21 of the pattress 20, and therefore to engage under the slides when the envelope 21 has reverted spontaneously to its relaxed position.

In the example shown in FIGS. 1 to 4, the system in accordance with the invention is used to fix a single electrical device 100. The pattress 20 is therefore individually associated with the single device, in combination with the support frame 1. However, it is equally possible to fix a plurality of electrical devices 100 by means of the same system, as shown in FIGS. 5 and 6. Accordingly, in the example shown, and as previously mentioned, the dimensions of the support frame 1 are chosen so that it can receive either one device 100 or two devices 100.

When, as shown in FIGS. 5 and 6, the support frame 1 receives two devices 100, the problem arises of accommodating the rear part of the two devices 100 in the pattress 20, whose radial dimension limits its capacity to receiving a single device.

In this case, using a larger size pattress of oblong, for example oval or rectangular, shape could be envisaged. However, with the aim of minimizing the number of types of parts, and therefore of product codes, needed to use the system with a variable number of devices, the unitary pattress 20 is of modular design. To be more precise, the pattress 20 has a line of weakness 27 extending over the cylindrical envelope 21 and the bottom 23 to enable a lateral portion 28 of the pattress 20 to be detached. The line of weakness 27 is in a plane that is parallel to the axis of the cylindrical envelope 21 but does not contain that axis. Accordingly, if the lateral part 28 of the pattress 20 is detached, along the line of weakness 27, a lateral cut edge, designated by the same reference number 27, is freed which delimits a lateral opening by which two adjacent pattresses 20 can be combined, so that they are contiguous at their respective lateral cut edges 27, as shown in FIGS. 5 and 6. The resulting twinning of two pattresses 20 provides a double pattress able to accommodate the rear parts of the two devices 100 received on the support frame 1.

Although this is not shown, it is clearly equally possible to increase the modularity of the pattress 20 further by providing thereon a second line of weakness, symmetrical to the first one with respect to the axis of the cylindrical envelope 21, so that two lateral portions of the pattress 20 can be detached, freeing two lateral openings through each of which the pattress in question can be associated with an additional pattress. This combines three or even more successive pattresses, which, by recessing the bottom 112 of the base section 111 of the conduit 110, provides a space able to accommodate any number of electrical devices and/or a large electrical device. The length of the support frame 1 is of course adapted to suit the number and dimensions of the devices to be installed.

Similarly, the circular opening 119 formed in the bottom 112 of the base section 111 of the conduit 110 is replicated a number of times corresponding to the number of pattresses 20 associated in this way, with an offset between each opening and the next corresponding to the existing distance between the centers of two consecutive pattresses. In this regard, note that using a single modular pattress 20 offers the additional advantage of requiring only one tool to make the openings 119 in the bottom 112 of the base section 111, the tool making a single size of opening with substantially the same diameter as the pattress 20. The opening obtained with the tool is simply replicated as many times as necessary, with the necessary offset, less than the diameter of the opening 119, to obtain a larger overall opening with a shape perfectly matched to that of the contour of the combined modular pattress obtained by associating a series of individual pattresses 20.

What is claimed is:

1. A system for housing at least one electrical device in a wiring conduit, the wiring conduit has a depth less than the depth of the at least one electrical device, said system comprising:

at least one support having fixing means for fixing said support in said conduit and receiving means for receiving the at least one electrical device so that a front face of the at least one electrical device is substantially flush with a front face of said conduit via a corresponding opening therein, said conduit having a bottom, a pattress structured to be received in an opening in the bottom of the conduit and defining a recess for accommodating a rear part of the at least one electrical device, said pattress being separate from said support, and means for fixing the pattress to said conduit separately from said support.

2. The system claimed in claim 1 wherein said receiving means in said support accommodates two or more electrical devices, there being two or more said pattresses, each of said pattresses for accommodating one of the two or more electrical devices.

3. The system claimed in claim 1 including at least two pattresses each having a line of weakness for enabling the detachment of a lateral portion of said pattress along a lateral cut edge delimiting a lateral opening by which two adjacent pattresses can be combined so that they are contiguous at their respective lateral cut edges.

4. The system claimed in claim 3 wherein each pattress has a generally cylindrical sidewall and said line of weakness lies in a plane parallel to the axis of the cylindrical sidewall and spaced therefrom.

5. The system claimed in claim 4 wherein each pattress has two lines of weakness symmetrical to each other with respect to said axis of said cylindrical sidewall.

6. The system claimed in claim 1 wherein said means for rising said support to said conduit include at least two lateral skids structured to be engaged with two associated slides formed longitudinally on said bottom of said conduit.

7. The system claimed in claim 6 wherein at least one of said lateral fixing skids of said support is mobile laterally between a configuration in which it is immobilized by friction on the corresponding slide of said conduit, a configuration in which it can slide freely on said slide, and a configuration in which it is completely released from said slide.

8. The system claimed in claim 7 wherein said mobile skid is acted on by a locking member mobile between a locking position holding said mobile skid in its configuration immobilized on said slide and an unlocking position leaving said mobile skid free to revert to its configuration of freely sliding on said slide or of complete release from said slide.

9. The system claimed in claim 8 wherein said locking member of said mobile skid includes a cam member pivotally mounted on said support and structured to receive an actuator of any kind for pivoting it between two angular positions constituting said locking and unlocking positions.

10. The system claimed in claim 9 wherein said two angular positions of said cam member are separated by one quarter-turn.

11. The system claimed in claim 10 wherein said cam member comprises a journal received to pivot freely in a well or bearing formed on said support, a head disposed at one of the two ends of said journal and on which is formed an actuation imprint arranged to cooperate with a screwdriver or like tool, and a shoe disposed at the other end of said journal and having the overall shape of a parallelepiped elongate transversely to the pivot axis of said journal.

12. The system claimed in claim 11 wherein said shoe of said cam member has a boss structured to be received in an imprint formed in a corresponding part of said support to immobilize said cam member temporarily in a locking position.

13. The system claimed in claim 12 wherein said boss on said shoe of said cam member is formed on the top of said shoe and the imprint for receiving said boss is formed in a first rear end shoulder of said well receiving said journal of said cam member, said head of said cam member being abutted against a front end shoulder of said well so that the top of said shoe of said cam member is pressed tightly against said rear end shoulder of said well by virtue of slight elastic deformation of said cam member as a whole.

14. The system claimed in claim 12 wherein said boss on said shoe of said cam member is formed on a tip of said shoe and said imprint for receiving said boss is formed in said mobile skid at the location of the pivot axis of said cam member.

15. The system claimed in claim 11 wherein said journal of said cam member has a profile of star-shaped cross section.

16. The system claimed in claim 12 wherein said cam member, its journal, its head and its shoe are molded in one piece from a plastic material.

17. The system claimed in claim 6 wherein said support and its lateral fixing skids are molded in one piece from a plastic material.

18. The system claimed in claim 11 wherein said shoe is mobile as a result of a resilience of said shoe, with a relaxed configuration corresponding to said configuration in which it is interengaged with and slides freely on the corresponding slide of said conduit.

19. The system claimed in claim 1 wherein said means for fixing said pattress to said conduit include rigid bearing lugs projecting radially outwardly therefrom, said bearing lugs being cooperable with said bottom of said conduit.

20. The system claimed in claim 19 wherein said means for fixing said pattress to said conduit include at least two locking fingers formed at an open top edge of said pattress interengageable with a corresponding slide on said bottom of said conduit.

21. The system according to claim 20 wherein said pattress is radially outwardly deformable for permitting inter-engagement of said at least two locking fingers with said corresponding slide.

22. The system according to claim 1 wherein the corresponding opening in the conduit is defined in a cover member cooperable with a body member which together comprises the conduit.

\* \* \* \* \*